July 22, 1952  M. R. SMITH  2,604,267
TEMPERATURE CONTROL APPARATUS
Filed Nov. 1, 1948  2 SHEETS—SHEET 1

Fig. 1.

Inventor
MYRON R. SMITH
By
George H. Fisher
Attorney

Patented July 22, 1952

2,604,267

UNITED STATES PATENT OFFICE 2,604,267

TEMPERATURE CONTROL APPARATUS

Myron R. Smith, Minneapolis, Minn., assignor to Minneapolis-Honeywell Regulator Company, Minneapolis, Minn., a corporation of Delaware Application November 1, 1948, Serial No. 57,668

25 Claims. (Cl. 236—46)

The present invention relates generally to an apparatus for maintaining a desired temperature in a space being heated, and more specifically to that type of control apparatus which is operated in accordance with the amount of heat needed to maintain a desired temperature.

In present day heating of large buildings, either apartment buildings or office buildings, it is much easier to control the temperature of the building from one central point and use as the controlling temperature that temperature which will indicate the amount of heat needed to be added to the building to make it comfortable. A desirable temperature to use in this respect is outdoor temperature for that is the temperature which is the main factor in determining the amount of heat lost from the building. To utilize this outdoor temperature it is necessary to measure the temperature and operate appropriate heating means at a rate determined by the measured outdoor temperature.

The present invention proposes utilizing the outdoor temperature as sensed by a temperature sensing resistor to affect the balance of an electrical network. Located within that electrical network is a cycling resistor which functions upon being heated and then cooling to cycle the balance of the network at a rate determined by the temperature of the outdoor resistor. Suitable detecting means are provided for detecting the balance of the network and which when energized are effective to initiate operation from space heating means which is cycled at the same rate as the balance of the network. A night shutdown is also provided to prevent the supplying of unneeded heat in the building and this is accomplished by heating continuously a cycling resistor to unbalance the network to maintain this balance of the network in a direction to prevent operation of the detecting means and the space heating means. To insure that the temperature of the building is up at the desired time in the morning, a morning pickup is provided which will initiate operation of the heating means at a time that will be dependent upon the outdoor temperature and which will insure that the temperature of the building will be up to the desired value at a predetermined time. By a minor change in the electrical network, it is possible to sense not only outdoor temperature but also the wind condition which would have an effect upon the amount of heat loss from the building which is being heated.

It is therefore an object of the present invention to provide an improved apparatus which cycles the heating apparatus at a rate determined by outdoor temperature.

A further object of the present invention is to provide an improved apparatus which cycles the heating apparatus at a rate determined by outdoor temperature and wind.

A still further object of the present invention is to provide an apparatus which cycles the heating apparatus according to the heating and cooling rate of a cycling resistor in an electrical bridge and providing therewith a night shutdown which continuously applies heat to the cycling resistor.

Still another object of the present invention is to provide an improved control apparatus which cycles the heating apparatus according to the heating and cooling rate of a cycling resistor in an electrical bridge and providing therewith a night shutdown which continuously applies heat to the cycling resistor and a morning pickup where the heat applied to the cycling resistor is decreased so that the heating apparatus will be brought into operation at a time dependent upon the outdoor temperature.

These and other more specific objects of the invention will be apparent upon a consideration of the following specification, claims and drawings in which:

Figure 1:
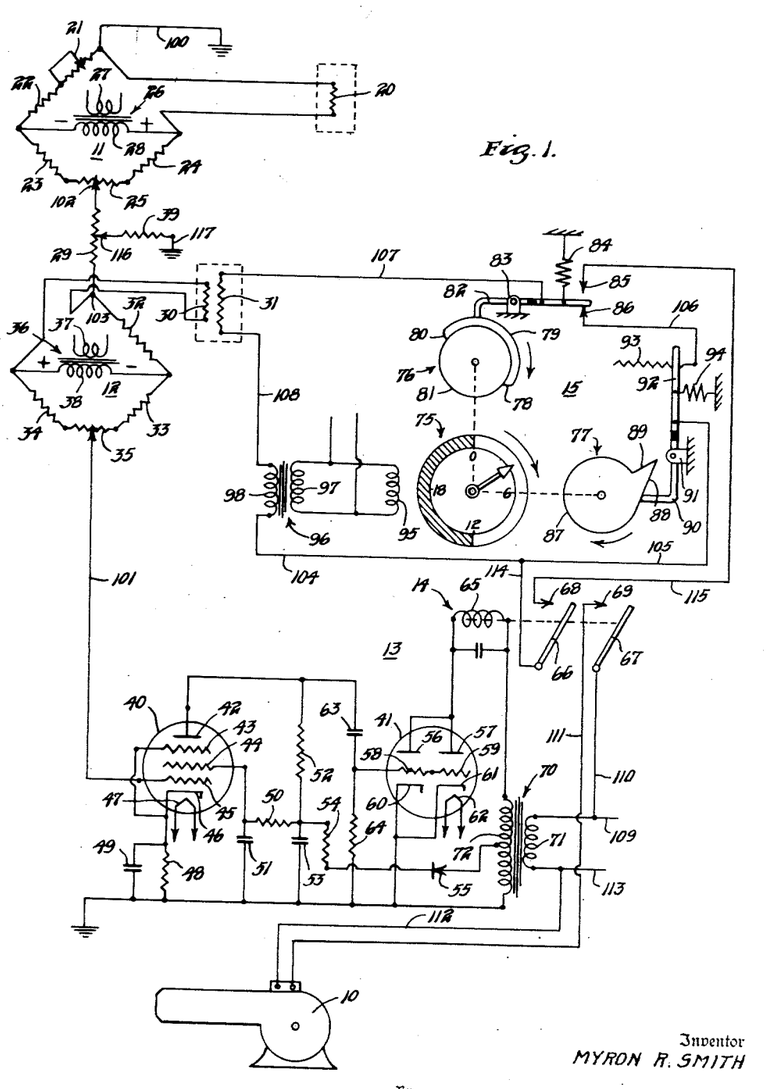
Figure 1 shows schematically one particular embodiment of the present invention.

Referring now to Figure 1, the numeral 10 represents an oil burner which may be used to supply heat to the building whose temperature is being controlled. The apparatus for controlling this oil burner 10 consists basically of a pair of Wheatstone bridges 11 and 12 which have temperature sensing resistors therein and whose balance is detected by an amplifier indicated at 13. When the amplifier 13 indicates a need for operation of the burner, a relay 14 will become energized and switch contacts thereof will be actuated to complete an energizing circuit to the burner 10. A timing apparatus indicated generally at 15 is provided to give night shutdown and provides for a variable morning pickup.

More specifically the bridge 11 is an electrical bridge of the Wheatstone type which has as one arm thereof a thermostatic device in the form of an outdoor temperature sensing resistor 20. Connected in counterbalancing relation to the resistor 20 is a rheostat 21 which is used to vary the balance of the control network and determines the outdoor temperature at which the control apparatus will no longer cause energization of the burner. Resistors 22, 23 and 24 are fixed resistors and have zero temperature coefficients of resistance and these resistors form the other leg of the Wheatstone bridge. A potentiometer 25 is provided for calibrating the bridge 11. Supplying power to the bridge is a transformer 26 which has a primary winding 27 which may be connected to any suitable power source and a secondary winding 28. Coupling bridge 11 to bridge 12 is a potentiometer 29 which may be called a design temperature selector. The bridge 12 is also of the Wheatstone type and may be seen to consist of a temperature sensing resistor 30 which will be referred to as a cycling resistor and which has associated therewith a resistance type of heater 31. Also included in the bridge 12 are fixed resistors 32, 33 and 34 which have zero temperature coefficients of resistance. A potentiometer 35 is provided to calibrate this particular bridge. Supplying energy to the bridge 12 is a transformer 36 having a primary winding 37 and a secondary 38. Associated with the slider of the design temperature selector 29 is a fixed resistor 39.

The amplifier 13 includes a pair of electron discharge devices 40 and 41. The discharge device 40 may be of the pentode type and may contain an anode 42, a suppressor grid 43, a screen grid 44, a control grid 45, a cathode 46 and a heater 47 associated with the cathode 46. Located in the cathode circuit of the pentode 40 is a cathode biasing resistor 48 and a by-pass condenser 49. The operating voltage for the screen grid 44 is obtained through a screen resistor 50 while a screen by-pass condenser is indicated at 51. A resistor 52 acts as a plate load resistor for the pentode 40 while a condenser 53 is a filter condenser in the plate voltage supply. A resistor 54 is a filter resistor associated with the rectifier 55 which may be of a selenium type. The discharge device 41 may be of the double triode type of tube which has corresponding parts of each triode connected in parallel. The discharge device 41 may be seen to consist of a pair of anodes 56 and 57, a pair of control grids 58 and 59, and a pair of cathodes 60 and 61 heated to be electron emissive by the cathode heater 62. A coupling condenser 63 is provided to connect the output voltage from the pentode 40 to the input control electrodes 58 and 59 of discharge device 41. A resistor 64 functions in the normal manner as a grid leak resistor. Located in the anode circuit of the parallel connected triode is a relay 14 which may be seen to consist of the relay winding 65 and a pair of switch blades 66 and 67 normally biased out of engagement with their associated switch contacts 68 and 69. A transformer 70 is provided for supplying power to the amplifier and may be seen to consist of a primary winding 71 which may be connected to any suitable source of power not shown and a secondary winding 72.

A timer 15 consists of a timing motor 75 which may be of any suitable type of clock mechanism and a pair of cams 76 and 77. The cam 76 consists of a cam riser surface 78, an up dwell camming surface 79, a fall camming surface 80 and a down dwell surface 81. Riding on the camming surface of the cam 76 is a cam follower 82 which is pivoted at 83 and maintains its bearing relation against the camming surface by a biasing spring 84. A pair of switch contacts 85 and 86 are associated with the cam follower blade 82. The cam 77 consists of a dwell surface 87, a riser camming surface 88 and a fall surface 89. Riding on the surface of the cam 77 is a follower 90 which is pivoted at 91 and which carries a slider 92 which is biased into the extreme right hand position of a slide-wire resistor 93 by a biasing spring 94. A motor winding 95 provides the motive power for the clock timing mechanism 75. The transformer 96 is provided to supply energy to the resistance heater 31 and this transformer may consist of a primary winding 97 connected to any suitable source of power and a secondary winding 98.

*Operation—Figure 1*

In considering the operation of the present apparatus it will be noted that the bridges 11 and 12 are connected in series by the slide-wire 29. With such a connection an electrical network is formed which has as output terminals the ground conductor 100 which is connected to the upper output terminal of bridge 11 and conductor 101 which is connected to the slider of the calibration potentiometer 35 of bridge 12. The degree of balance or unbalance of the bridge 11 will be determined primarily by the resistance of the outdoor temperature sensing resistor which will be assumed here to have a positive temperature coefficient of resistance. This will be understood since the other legs of the bridge do not have appreciable temperature coefficients of resistance. Assume the outdoor temperature is such as to indicate the need for heat in the building whose temperature is being controlled so that the bridge is unbalanced. With the transformer secondary 28 phased so that the left hand terminal of the secondary is negative and the right hand terminal of the secondary is positive, the output voltage of the bridge when measured from ground to terminal 100 is slider 102 of the calibration potentiometer 25 will be slightly negative.

The affect that bridge 11 will have upon the series connected bridges will depend upon the voltage from this bridge that is applied across the resistor 39. This voltage will depend upon the setting of the slider 116 upon the slide-wire 29 as will be seen when it is noted that a series circuit may be traced from ground terminal 100, bridge 11, slider 102, the upper half of slide-wire 29, slider 116, resistor 39 and ground 117 back to ground 100. In other words, the output voltage from bridge 11 that will be affecting the operation of the amplifier 13 will be that voltage appearing across the resistor 39, the remaining portion of the output from the bridge appearing on the upper half of slide-wire 29 where it will have no effect upon the amplifier. The reason for providing the resistor 39 and the slide-wire 29 will be considered later.

The degree of balance of the bridge 12 will be determined primarily by the resistance of the cycling resistor 30, since this resistor is the only one in the bridge having an appreciable temperature coefficient of resistance. When there is heat applied to the cycling resistor, assuming a positive temperature coefficient of resistance, the bridge 12 will become unbalanced. The voltage on the output terminals of the bridge, assuming that secondary 38 is phased to be positive on the left hand terminal and negative on the right hand terminal, will, when measured from the terminal 103 to conductor 101, be slightly positive. With the negative voltage from bridge 11 added to the positive voltage of bridge 12 they will cancel each other out and the network voltage measured from the output terminal at ground conductor 100 to conductor 101 will be zero or such a value as to not indicate a need for the addition of heat to the building being controlled. This will mean that the voltage on the input to the amplifier 13 will not be such as to cause energization of the relay 14. This is the condition in which the apparatus is in when the parts are positioned as shown in Figure 1. This condition will be hereafter called the night shutdown condition.

When operating under the night shutdown condition it is desired to have no operation of the burner 10 and this is accomplished by applying heat to the cycling resistor 30 continuously for the length of time it is desired to maintain night shutdown. With the apparatus as shown in Figure 1 it may be seen that the cam follower arm 82 is riding on the up dwell surface 79 of the cam 76. This means that the outer end of the cam follower arm 82 will be engaging the switch contact 86. The cam follower 90 will be riding on the dwell surface 87 so that the slider arm 92 which is actuated by the follower 90 is in the extreme right hand position on the slide-wire 93. When the cam followers are in this position as just described an electrical circuit may be traced from the secondary winding 98 of transformer 96 to the resistance heater 31 and this circuit is from the lower terminal of the secondary 98 through conductors 104 and 105, slider 92, the right hand terminal of slide-wire 93, conductor 106, switch 86, follower blade 83, conductor 107, resistance heater 31, and conductor 108 back to the upper terminal of the secondary 98. With a voltage applied to the resistance heater 31 heat will be applied to the cycling resistor 30 so that the balance of the bridge 12 will overcome the balance of the bridge 11 and there will be no indication for need of operation of the burner 10.

Next to be considered is the morning pickup of the subject control apparatus. As the building being heated may have cooled considerably during night shutdown it is desirable to see that the temperature of the building is up to the desired value at some predetermined time, for example, 6 a. m. As the amount of heat lost from the building will be dependent to a large extent on outdoor temperature it is desirable to have the morning pickup at a time that will be determined by the outdoor temperature. In other words, the time it takes to heat the building will be determined by the outdoor temperature. This is accomplished in the present invention by slowly decreasing the energization of the resistance heater 31 and therefore the amount of heat applied to the cycling resistor 30. As noted above, the circuit to the resistance heater 31 was traced through the slider 92 and the slide-wire 93. This slide-wire is used to add resistance into the electrical circuit which supplies energy to the resistance heater 31. Assume that the clock motor 75 has advanced the cams 76 and 77 so that they are in the position as shown in Figure 1. It will be noted that the cam follower 90 is on the leading edge of the cam riser 88. The time that the cam follower 90 arrives at this leading edge of the riser 88 may be, for example, 4 a. m. As the clock motor continues to rotate the cam 77 the lower end of the follower 90 will be forced to the right so that the follower moves about the pivot 91. The rate at which the follower moves will be determined by the slope of the riser 88 which may be adjusted to any desired position. As the follower 90 pivots about the pivot 91 the slider 92 begins to move across the slide-wire resistor 93 to have more resistance in the energizing circuit for the resistance heater 31. As the voltage applied to the resistance heater 31 is decreased due to the voltage drop in the slide-wire 93 there will be less heat applied to the cycling resistor 30 so that its temperature would begin to drop. With the temperature of the cycling resistor 30 dropping the resistance will decrease and the voltage on the bridge 12 will become less positive. As the voltage on the network becomes less positive there will be one point where this voltage will be insufficient to overcome the negative voltage in the network due to the bridge 11 which will mean that the amplifier 13 will become operative to energize the relay 14.

When the relay 14 becomes energized the switch blades 66 and 67 will be moved into engagement with their associated switch contacts 68 and 69. When the switch blade 67 engages switch contact 69 an energizing circuit is completed to the burner motor 10 and may be traced from the input power line 109 through conductor 110, switch blade 67, switch contact 69, conductor 111, burner 10, and conductor 112 back to the other input power line 113. The burner motor 10 will continue to operate until the morning pickup has been completed.

Obviously, if it is extremely cold the temperature sensing resistor 20 will be unbalancing the bridge 11 so that there will be a large negative voltage in the control network due to this unbalance. Under these conditions it will take a large positive voltage from the bridge 12 to overcome this negative voltage which will mean that the temperature of the cycling resistor 30 must be relatively high. As the morning pickup progresses with the slow deenergization of the resistance heater 31, the temperature of the resistance 30 will slowly cool or drop and under these conditions, assumed at present, the drop in temperature of the resistance 30 need only be a slight amount for the unbalance due to the outdoor resistor 20 to overcome the unbalance due to the cycling resistor 30. If the opposite condition were assumed where the outdoor resistor 20 were sensing to a temperature that were relatively high, it would be necessary under these conditions for the cycling resistor 30 to cool a considerable amount before the unbalance due to the outdoor resistor 20 would overcome the unbalance due to the cycling resistor 30. Again, the cooling rate of the cycling resistor 30 is determined primarily by the decreased voltage drop across the resistance heater 31 which in turn is a result of the timed operation of the slider 92 across the slide-wire 93. Here, the unbalance in bridge 12 will remain greater than that of bridge 11 for a longer time so that morning pickup will start later than in the previously assumed condition. Therefore morning pickup is provided which will initiate operation of a heating device at a time dependent upon the outdoor temperature so that it may be assured that the temperature of the building will be up to the desired value at a time when it is desired to go into normal daytime operation.

Figure 2:
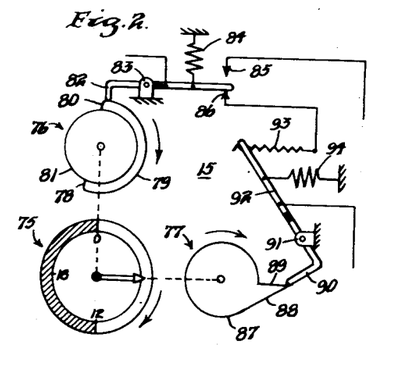
Figure 2 shows one position of the timing mechanism of the present invention.

In Figure 2 there is shown the timing apparatus 15 at an advanced stage of operation during the day operating cycle. Here it may be seen that the cams 76 and 77 have advanced in movement in a clockwise direction so that the follower 82 has reached the end of the up dwell surface 79 and is about to pass on to the fall surface 80. The follower 90 is shown to have reached the peak of the riser 88 and is about ready to drop over the fall 89. It will be noted that the follower 90 has moved the slider 92 across the extent of the slide-wire 93 so that a maximum amount of resistance will have been inserted into the energizing circuit of the resistance heater 31 shown in Figure 1.

Figure 3:
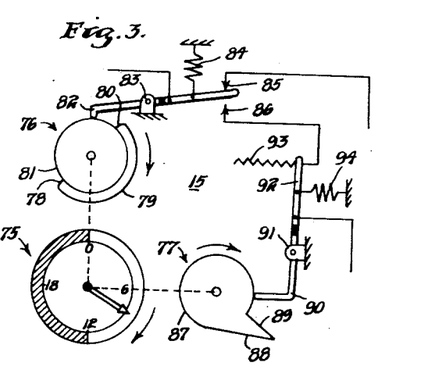
Figure 3 shows a further position of the timing apparatus.

Figure 3 is a still more advanced showing of the timing mechanism 15 as it proceeds through its normal operating cycle. In this figure it may be seen that the cam follower 82 has passed down the fall surface 80 and is now on the down dwell surface of cam 76. When in this position, the follower 82 has moved its extended portion into engagement with switch contact 85 and has opened its engagement with contact 86 that was shown in Figure 2. The cam follower 90 has passed down the fall surface 89 and is again riding on the dwell 87 in the same manner as shown in Figure 1. This means that the slider 92 has been moved back to the right hand position on the slide-wire 93 and will remain there until once again the riser 88 moves the cam follower 90 toward the right as explained above.

Returning to Figure 1, assume that the timing mechanism 15 is in the position as shown in Figure 3 or in the normal daytime position with the follower 82 riding on the down dwell surface 81 and engaging switch contact 85. The instant that the follow up blade 82 moves into engagement with switch contact 85 the burner 10 will normally be operating on its pickup cycle and this will mean that the switch blades 66 and 67 are engaging their respective contacts 68 and 69. With switch blade 66 engaging switch contact 68 a new energizing circuit will be established to the resistance heater 31 and this may be traced from the lower terminal of the secondary 98 through conductor 104, conductor 114, switch blade 66, switch contact 68, conductor 115, switch contact 85, follower blade 82, conductor 107, resistance heater 31, and conductor 108 back to the upper terminal of the secondary 98. It will be noted that this last traced circuit does not include the slide-wire resistor 93 so that the full voltage of the secondary 98 will be applied directly to the resistance heater 31. With the full voltage of the secondary 98 applied to the resistance heater 31 full heat will be applied to the cycling resistor 30 and the same will heat up at a predetermined rate and have a resistance change which will result in the unbalance voltage due to this resistor in bridge 12 becoming more positive to overcome the unbalance of bridge 11 due to the outdoor resistor 20. When the resistor heater 31 has heated the resistor 30 sufficiently that the balance of bridge 12 overcomes that of bridge 11 the output voltage on the input of the amplifier 13 will indicate a need for no further operation of the burner 10. This will mean that the relay 14 will become deenergized and a switch blade 66 and 67 will move out of engagement with their associated switch contacts 68 and 69. When the switch blade 67 moves out of engagement with switch contact 69 the energizing circuit to the burner 10 is broken so that it will stop operating. When the switch blade 66 moves out of engagement with its associated switch contact 68 the energizing circuit to the resistance heater 31 will be broken.

With the circuit to the resistance heater broken the cycling resistor 30 will begin to cool. Upon the resistor 30 cooling sufficiently the balance of the bridge 12 will be in a condition to overcome the unbalance due to the unbalance on the bridge 11 due to the outdoor resistor 20. When this condition occurs there will be an output voltage on the temperature sensing network and on the input to the amplifier 13 which will call for operation of the burner 10 and this will mean that the relay 14 will become energized. The apparatus will then go through another operating cycle where the resistance heater 31 will heat the cycling resistor 30 so that the resultant unbalance will overcome that due to the outdoor resistor 20. For a fixed outdoor temperature, the resistance of the resistor 20 will remain at a constant value and therefore the heating and cooling of the cycling resistor 30 will be at a constant rate and the apparatus will energize the burner 10 at a frequency corresponding to the heating and cooling of the cycling resistor 30.

In the event that there should be a colder outdoor temperature the resistance of the outdoor resistor 20 will have decreased so that there is a greater unbalance voltage in the bridge 11. With this greater amount of unbalance in the bridge 11 it will be necessary for the resistance heater 31 to heat the cycling resistor 30 for a longer time so that it will reach a higher temperature before the network will again be brought to a balanced condition. In other words, with a decrease in temperature of the outdoor resistor 20 the control apparatus will be operative to maintain the burner 10 in operation for a greater length of time. In the event that the outdoor temperature should rise considerably it will be obvious that there is less unbalance in the bridge 11 due to the resistance of the outdoor resistor 20 and therefore it will be unnecessary for the resistance heater to heat the cycling resistor 30 for any appreciable length of time in order to overcome the unbalance due to the outdoor resistor 20. This will mean that with a higher outdoor temperature the burner 10 will be operated for much shorter periods of time.

This cycling operation will continue throughout the daytime operation and all during this time the clock motor 75 will be rotating the cams 76 and 77 in a clockwise direction. As soon as the cam 76 has reached a point in time where it is desirable to have night shutdown again the cam follower 82 will go up the riser surface 78 and will move the blade 82 back into engagement with the switch contact 86 as shown in Figure 1. When the contact 86 is engaging the blade 82 the resistance heater 31 will once again be continuously energized through the circuit that was traced above. With the resistance heater 31 energized the temperature of the cycling resistor 30 will be increased and will overcome the unbalance due to the outdoor resistor 20 to maintain the unbalance such as to prevent operation of the relay 14.

In the event that the outdoor temperature should become extremely cold the resistance of the outdoor resistor 20 will be decreased sufficiently to overcome the unbalance due to the heat of resistor 31 applied to cycling resistor 30. The outdoor temperature at which this occurs is often referred to as the design temperature. When this condition occurs the unbalance of the network as applied to the input of the amplifier will be such as to indicate a need for operation of the burner 10 and therefore the burner 10 will be operated continuously until such time as the outdoor temperature rises and the unbalance of the bridge 11 is insufficient to overcome the unbalance of bridge 12. The apparatus is provided with an adjustment by which the design temperature may be varied, as for example, —20° F. to —80° F. This is provided for in the slide-wire 29 and resistor 39. As noted above, the slide-wire 29 is connected between the slider 102 of the calibration potentiometer 25 and the terminal 103 of bridge 12. The slider 116 is associated with a slide-wire 29 and connected between the slider 116 and ground 117 is the resistor 39. This resistor-potentiometer combination is, in effect, an authority control which varies the controlling effect the bridge 11 will have upon the entire control network. When slider 116 is at the lower end of the slide-wire 29 the output voltage of the bridge 11 will be divided across upper portion of the slide-wire 29 and on resistor 39 so that when in this position the unbalance voltage due to the bridge 11 will have a much smaller effect upon the output voltage of the control network because of the voltage drop on slide-wire 29, than would be the case where the slider 116 is moved to its upper extreme position where the full effect of the unbalance of bridge 11 would be felt in the control network with all of the voltage output applied on resistor 39. With this novel manner of connecting the design temperature selector or authority control into the control apparatus it is possible to get a linear selection of design temperature with linear movement of the slider 116 over the slide-wire 29. This is particularly desirable in setting up calibration dials for the subject apparatus as will be explained hereinafter.

In addition to providing a design temperature control which will determine when the apparatus will be operating the burner 10 continuously, it is desirable to have a fade-out selector which will determine at what temperature the outdoor resistor will no longer function to unbalance the control network to indicate a need for operation of the burner 10. This is accomplished by means of the rheostat 21 which is connected in counterbalancing relation to the outdoor resistor 20. Movement of this fade-out rheostat slider may vary the fade-out temperature from, for example, 50° F. to 80° F. The movement of the slider of this rheostat will produce a linear selection of the fade-out temperature between the maximum and minimum points. This will mean that it is possible to provide a calibration dial for the fade-out rheostat which will have linear calibrations thereon.

The electrical effect of the fade-out temperature selector 21 is to adjust the balance of bridge network 11 to a value that will be equal and opposite the balance of network 12, with the cycling resistor at its ambient or cool temperature. In other words, there will be a balanced condition on the input of amplifier 13 and there will be no operation of the relay 14. For example, assume a fade-out setting of selector 21 of 65°. With this setting, when an outdoor temperature of 65° is reached, the unbalance in bridge 11 will be equal and opposite the unbalance in bridge 12, with the cycling resistor 30 at its ambient temperature so that the input to amplifier 13 will be balanced. At all outdoor temperatures above the 65° setting the apparatus will remain inoperative.

Movement of the fade-out selector 21 has a direct effect upon the temperature at which the apparatus will fade-out and the temperature at which the apparatus will energize the burner continuously, or the design temperature. In order to maintain the same design temperature setting it is necessary to change the setting of the design temperature selector when a change is made in the setting of the fade-out selector. In other words, movement of the fade-out selector 21 will have the effect of changing the fade-out temperature a certain value and the design temperature by a corresponding value in the same direction. Movement of the design temperature selector, however, wil not have an effect upon the fade-out temperature. Thus, since movement of the sliders of both the design temperature selector and fade-out selector produce linear changes in the selected temperatures it is possible to have the calibration dials directly interconnected so that a movement of the fade-out selector 21 will result in a change in the indicated calibration setting of the design selector 116.

Figure 4:
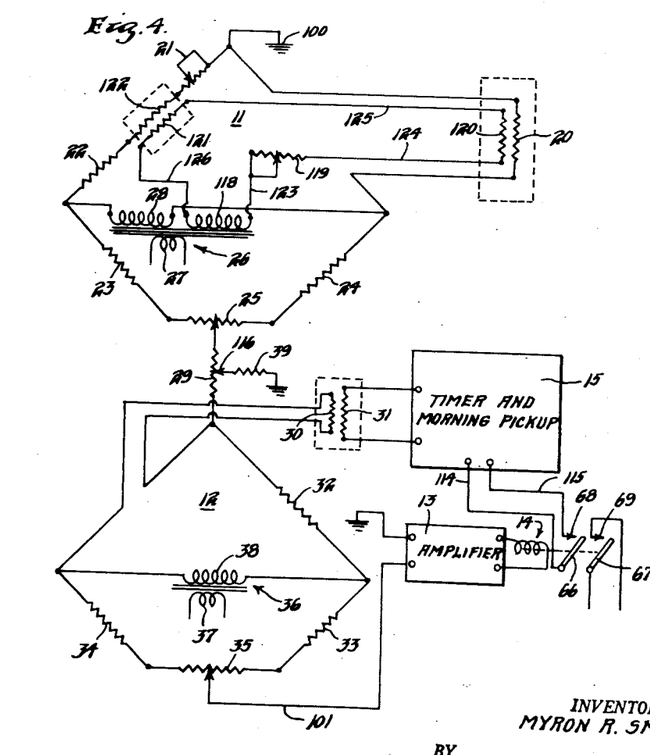
Figure 4 shows a modification of the invention as shown in Figure 1 with a wind compensator associated with the outdoor temperature sensing element.

*Figure 4*

In Figure 4 is shown a modification of the apparatus shown in Figure 1. Components which are similar to those shown in Figure 1 carry the same reference numerals while the amplifier 13 and timer 15 are shown in block diagram form. Added to the transformer 26 is a secondary winding 118 which supplies energy through a rheostat 119 to a pair of resistance heaters 120 and 121. Located in one arm of the bridge in counterbalancing relation to the outdoor temperature sensing resistor 20 is a further temperature sensing resistor 122. The provision of these added components makes it possible to have compensation for the wind as well as the outdoor temperature in determining the amount of heat that will be needed to keep the building warm or the rate at which the cycler resistor 30 will time the operation of the burner. The functioning of the apparatus will be almost identical to that of Figure 1 in that there will be the same type of night shutdown, morning pickup and daytime operation only in the apparatus as shown in Figure 4 the control will be accomplished according to outdoor temperature and the wind velocity.

Compensation in the present showing is accomplished by applying heat to the outdoor temperature sensing resistor 20. As there is heat applied to the resistor 20 it is necessary to balance that change in temperature due to the heating of the resistor. This is accomplished by connecting a temperature sensing resistor 122 in counterbalancing relation to the resistor 20 and applying thereto the same amount of heat that is supplied to the resistor 20. The applying of heat to the outdoor resistor 20 and the balancing resistor 122 is accomplished by the secondary 118 which supplies energy to these heaters in a circuit that may be traced from the right hand terminal of the secondary 118 through conductor 123, rheostat 119, conductor 124, resistance heater 120, conductor 125, resistance heater 121, and conductor 126 back to the left hand terminal of the secondary 118. As the resistor is located in an exposed relation to wind and outdoor temperature it will be obvious that if a wind is blowing the heat from the heater 120 will be conducted away from the resistor 20 and the rate of heat loss will be dependent upon the wind velocity.

Assume that there is no wind velocity and the apparatus is functioning in its normal manner. Heat will be applied by the resistance heater 120 to the outdoor resistor 20 and likewise heat will be applied by the resistance heater 121 to the balancing resistor 122. Under these conditions the bridge 11 will be unbalanced by an amount proportional to outdoor temperature only. Obviously, during daytime operation, the apparatus by way of cycler resistor 30 will be cycling the burner 10 at a rate determined by this outdoor temperature. In the event that a wind should come up, assuming that the outdoor temperature remained constant, some of the heat applied to the resistor 20 will be conducted away by the wind. This will have the effect of unbalancing the bridge 11 as though the outdoor temperature had actually dropped. With the resistor effectively indicating more adverse weather conditions or a need for operation of the burner because of the wind, the unbalance of the bridge 11 will be greater and therefore it will be necessary for the resistance heater 31 to heat the cycling resistor 30 for a greater length of time in order to counteract the unbalance due to the resistance of the resistor 20. Therefore, the cycling rate of operation of the burner 10 will be dependent upon not only outdoor temperature but also wind velocity.

By providing the counterbalancing temperature resistor 122 in the bridge 11 and the heater 121 associated therewith it is possible to compensate for changes in voltage that might effect the heating supplied to the outdoor resistor 20 if that were the only element in the network having heat applied thereto. This eliminates the need for any voltage regulating apparatus for the heater associated with the resistor 20. By providing the rheostat 119 it is possible to determine the amount of energization that will be applied to the resistance heaters 120 and 121 and therefore control the amount of wind compensation that may be desired for one particular installation.

While the foregoing description of the operation of the subject apparatus has been concerned with the operating of a fuel burner, it is to be understood that it can be used with any temperature changing means whether of the heat adding type, as explained, or of the heat extracting type, as a refrigeration apparatus. In order to use the apparatus with a refrigeration apparatus, the outdoor temperature sensing resistor 20 and fade-out selector 21 would be reversed in their connections to the bridge 11, as shown in Figure 1. Here then, with a refrigeration apparatus, the fade-out selector would determine the outdoor temperature below which the control apparatus would not energize the refrigeration apparatus and the design temperature selector would determine the outdoor temperature above which the apparatus would energize the refrigeration apparatus continuously.

From the foregoing it can be seen that I have provided a temperature control apparatus employing a pair of electrical bridges whose balance is cycled at a rate determined by outdoor temperature and have further provided therewith an apparatus for unbalancing the bridges for night shutdown. Further provision has been made with the foregoing for a variable morning pickup which will be determined in one instance by outdoor temperature and in another instance by outdoor temperature and wind velocity.

Numerous objects and advantages of my invention have been set forth in the foregoing description and while one particular embodiment has been described it is to be understood it has been for illustrative purposes only and I therefore intend to be limited in my invention solely by the scope of the appended claims in which I claim:

1. In an apparatus for maintaining a condition at a plurality of levels, a source of power, an electrical device, cyclically operating switch means, means including said cyclically operating switch means for connecting said device in an energizing circuit to said source of power, timing means including first and second cam means, cam operated switch means actuated by said first cam means, means connecting said cam operated switch means between said source of power and said device so that when said cam switch means is actuated said device is energized and said cyclically operating switch means is rendered ineffective to energize said device, variable impedance means, means connecting said variable impedance means in said last named connection, and means including said second cam means for varying said impedance when said first cam switch means is actuated.

2. In combination in a temperature control apparatus, temperature changing means, a control device, said device being operable when in a first condition to initiate operation of said temperature changing means and when in a second condition to stop operation of said temperature changing means, condition changing means associated with and connected to said control device for changing the condition of said device, a source of power means including said control device for connecting said condition changing means to said source when said device is in said first condition, said changing means when so energized after a predetermined time delay causing said control device to assume said second condition, timing means, means including said timing means when actuated for energizing said condition changing means independently of said control device to maintain said device in said second condition, a timing device, a variable impedance means whose impedance is adjusted by said timing device, and means connecting said variable impedance means in circuit with said condition changing means when said timing means is actuated so that after a predetermined time delay the effect of said condition changing means on said device will decrease and said device will assume said first condition.

3. In combination in a temperature control apparatus, a control device having temperature responsive means therein, said device being operable when in a first condition to initiate operation of temperature changing means and when in a second condition to stop operation of said changing means, heating means directly associated with the temperature responsive means of said control device, a source of power means including said control device for connecting said heating means in an energizing circuit to said source when said device is in said first condition so that after a predetermined time delay said heating means will affect said control device to cause said device to assume said second condition, timing means, means including said timing means when actuated for energizing said heating means independently of said control device to maintain said device in said second condition, variable impedance means whose impedance is varied by said timing means, and means connecting said variable impedance means in circuit with said heating means when said timing means is actuated so that the effect of said heating means on said temperature responsive means will be varied.

4. In a temperature control apparatus, a first electrical network including therein a first temperature sensing resistor which senses to a temperature representative of the heat needed to maintain a desired temperature in a space being heated, a second electrical network including therein a second temperature sensing resistor, means interconnecting said first and second networks to form together a balanced electrical circuit having a pair of output terminals with a signal thereon indicative of the balance of both of said networks, detecting means connected to said output terminals, said detecting means being operable when the voltage on said output terminals is of a first value to initiate operation of space heating means and when of a second value to discontinue operation of the space heating means, an electric heater located in heat exchange relation with said second resistor and operable to affect the balance of said circuit, and means including said detecting means for energizing said heater when a voltage of said first value is on said output terminals so that said heater will heat said second resistor and after a time delay determined by the temperature of said first resistor will cause the voltage on said output terminals to assume said second value.

5. In a temperature control apparatus, a first electrical network including therein a first temperature sensing resistor which senses to a temperature representative of the heat needed to maintain a desired temperature in a space being heated, a second electrical network including therein a second temperature sensing resistor, means interconnecting said first and second networks to form a balanced electrical circuit having a pair of output terminals, detecting means connected to said output terminals, said detecting means being operable when the voltage on said output terminals is of a first value to initiate operation of space heating means and when of a second value to discontinue operation of the space heating means, an electric heater located in heat exchange relation with said second resistor, means including said detecting means for energizing said heater when a voltage of said first value is on said output terminals so that said second resistor will assume a value which will cause the voltage on said output terminals to assume said second value after a time delay determined by the temperature of said first resistor, timing means, and means including said timing means when actuated for energizing said heater continuously and independently of said detecting means.

6. In a temperature control apparatus, a first electrical network including therein a first temperature sensing resistor which senses to a temperature representative of the heat needed to maintain a desired temperature in a space being heated, a second electrical network including therein a second temperature sensing resistor, means interconnecting said first and second networks to form a balanced electrical circuit having a pair of output terminals, detecting means connected to said output terminals, said detecting means operable when the voltage on said output terminals is of a first value to initiate operation of space heating means and when of a second value to discontinue operation of the space heating means, an electric heater located in heat exchange relation with said second resistor, means including said detecting means for energizing said heater when a voltage of said first value is on said output terminals so that said second resistor will assume a value which will cause the voltage on said output terminals to assume said second value after a time delay determined by the temperature of said first resistor, timing means, means including said timing means when actuated for energizing said heater continuously and independently of said detecting means, variable impedance means connected in said last named energizing circuit, and means including said timing means for varying the impedance of said variable impedance means so that said heater will vary the heat applied to said second resistor and the voltage on said output terminals will assume said first value at a time determined by the temperature of said first resistor.

7. In a space temperature control apparatus, a complex electrical network having first and second temperature responsive resistors, said network having output terminals with a voltage thereon indicative of the need or lack of need for operation of a space temperature changing means, means including detecting means sensing the voltage on said output terminals and initiating operation of space temperature changing means when a first voltage is on said terminals, means locating said first resistor in exposed relation to a temperature indicative of the percentage of time the temperature changing means need operate to maintain a desired space temperature and connecting said resistor in said network so as to cause said first voltage to appear on said terminals upon said control temperature indicating a need for operation of the temperature changing means, a heater located directly in heat exchange relation to said second resistor, means connecting said second resistor in said network, means including said detecting means for energizing said heater when said first voltage is on said terminals so that said second resistor will be heated and balance said network to remove said first voltage, timing means operative for a predetermined length of time, and means including said timing means for continuously energizing said heater to prevent said first voltage from appearing on said terminals unless the temperature of said first resistor changes beyond a predetermined value.

8. In a space temperature control apparatus, a complex electrical network having first and second temperature responsive resistors, said network having output terminals with a voltage thereon indicative of the need or lack of need for operation of a space temperature changing means, means including detecting means sensing the voltage on said output terminals and initiating operation of space temperature changing means when a first voltage is on said terminals, means locating said first resistor in exposed relation to a temperature indicative of the percentage of time the temperature changing means need operate to maintain a desired space temperature and connecting said resistor in said network so as to cause said first voltage to appear on said terminals upon said control temperature indicating a need for operation of the temperature changing means, a heater located in heat exchange relation to said second resistor, means connecting said second resistor in said network, means including said detecting means for energizing said heater when said first voltage is on said terminals so that said second resistor will be heated and balance said network to remove said first voltage, timing means operative for a predetermined length of time, and means including said timing means for continuously energizing said heater to prevent said first voltage from appearing on said terminals unless the temperature of said first resistor changes beyond a predetermined value.

9. A temperature control apparatus comprising in combination, a first electrical bridge having as one leg thereof an outdoor temperature sensing resistor, a second electrical bridge having as one leg thereof a cycling resistor having an appreciable temperature coefficient of resistance, means connecting said first and second bridges in series to form a balanced network having output terminals, detecting means operable when energized for initiating operation of a space temperature changing means, means connecting said detecting means to said output terminals so that said detecting means is operable when the voltage on said output terminals is of a first value and when of a second value said detecting means is inoperative, a heater for said cycling resistor, and means including said detecting means for energizing said heater when a voltage of said first value is on said output terminals so that said cycling resistor is heated and the voltage on said terminals is changed to said second value whereupon said heater becomes deenergized, said heater remaining deenergized until said cycling resistor cools and a voltage of said first value appears on said output terminals whereupon said heater will again be energized and will thereafter cause said output voltage to cycle between said first and second voltages at a rate determined by the temperature of said outdoor resistor.

10. A temperature control apparatus comprising in combination, a first electrical bridge having as one leg thereof an outdoor temperature sensing resistor, a second electrical bridge having as one leg thereof a cycling resistor having an appreciable temperature coefficient of resistance, means connecting said first an second bridges in series to form a balanced network having output terminals, detecting means operable when energized for initiating operation of space temperature changing means, means connecting said detecting means to said output terminals so that said detecting means is operative when the voltage on said output terminals is of a first value and when of a second value said detecting means is inoperative, a heater for said cycling resistor, means including said detecting means for energizing said heater when a voltage of said first value is on said output terminals so that said cycling resistor is heated and the voltage on said terminals is changed to said second value whereupon said heater becomes deenergized, said heater remaining deenergized until said cycling resistor cools and a voltage of said first value appears on said output terminals whereupon said heater will again be energized and will thereafter cause said output voltage to cycle between said first and second voltages at a rate determined by the temperature of said outdoor resistor, timing means, and means including said timing means for energizing said heater continuously for a length of time to maintain a voltage of said second value on said terminals unless the temperature of said outdoor resistor drops below a predetermined value.

11. A temperature control apparatus comprising in combination, a first electrical bridge having as one leg thereof an outdoor temperature sensing resistor, a second electrical bridge having as one leg thereof a cycling resistor having an appreciable temperature coefficient of resistance, means connecting said first and second bridges in series to form a balanced network having output terminals, detecting means operable when energized for initiating operation of space temperature changing means, means connecting said detecting means to said output terminals so that said detecting means is operable when the voltage on said output terminals is of a first value and when of a second value said detecting means is inoperative, a heater for said cycling resistor, means including said detecting means for energizing said heater when a voltage of said first value is on said output terminals so that said cycling resistor is heated and the voltage on said terminals is changed to said second value whereupon said heater becomes deenergized, said heater remaining deenergized until said cycling resistor cools and a voltage of said first value appears on said output terminals whereupon said heater will again be energized and will thereafter cause said output voltage to cycle between said first and second voltages at a rate determined by the temperature of said outdoor resistor, timing means for energizing said heater continuously to maintain a voltage of said second value on said terminals, variable impedance means, means connecting said impedance means in circuit with said heater when continuously energized, and means including said timing means for varying the impedance of said variable impedance means to decrease the energization of said heater so that said first voltage will appear on said terminals when the resistance of said cycling resistor is insufficient to counterbalance the resistance of said outdoor resistor.

12. A temperature control apparatus comprising in combination, a first electrical bridge having an outdoor temperature sensing resistor as one leg thereof, said bridge having one grounded output terminal and another output terminal, a second electrical bridge having as one leg thereof a cycling resistor having an appreciable temperature coefficient of resistance, said second bridge having first and second output terminals, a slide-wire resistor connected between said other terminal of said first bridge and said first terminal of said second bridge, detecting means, means connecting said detecting means between said ground terminal of said first bridge and said second terminal of said second bridge to sense the balance of said bridges, means including said detecting means for cyclically energizing said cycling resistor, said energization being continuous when the temperature of said outdoor resistor drops below a predetermined value, a slider for said slide-wire resistor, a fixed resistor, and means connecting said resistor between said slider and said ground terminal of said first bridge so that when said slider is in one extreme position the temperature of said outdoor resistor which will result in continuous energization of said cycling resistor will be of a first value and when said slider is in the opposite extreme position the temperature resulting in continuous energization of said cycling resistor will be of a second value.

13. A temperature control apparatus comprising in combination, a first electrical bridge having an outdoor temperature sensing resistor as one leg thereof, said bridge having one grounded output terminal and another output terminal, a second electrical bridge having as one leg thereof a cycling resistor having an appreciable temperature coefficient of resistance, said second bridge having first and second output terminals, a slide-wire resistor connected between said other terminal of said first bridge and said first terminal of said second bridge, detecting means, means connecting said detecting means between said ground terminal of said first bridge and said second terminal of said second bridge to sense the balance of said bridges, means including said detecting means for cyclically energizing said cycling resistor, said energization being continuous when the temperature of said outdoor resistor drops below a predetermined value, a slider for said slide-wire resistor, a fixed resistor, and means connecting said resistor between said slider and said ground terminal of said first bridge so that when said slider is in one extreme position the design temperature of said apparatus will be of a first value and when said slider is in the opposite extreme position the design temperature will be of a second value.

14. A temperature control apparatus comprising in combination, a first electrical bridge having an outdoor temperature sensing resistor as one leg thereof, said bridge having one grounded output terminal and another output terminal, a second electrical bridge having as one leg thereof a cycling resistor having an appreciable temperature coefficient of resistance, said second bridge having first and second output terminals, a slide-wire resistor connected between said other terminal of said first bridge and said first terminal of said second bridge, detecting means, means connecting said detecting means between said ground terminal of said first bridge and said second terminal of said second bridge to sense the balance of said bridges, means including said detecting means for cyclically energizing said cycling resistor, said energization being continuous when the temperature of said outdoor resistor drops below a predetermined value, a slider for said slide-wire resistor, a fixed resistor, and means connecting said resistor between said slider and said ground terminal of said first bridge so that when said slider is in one extreme position the design temperature of said apparatus will be of a first value and when said slider is in the opposite extreme position the design temperature will be of a second value, said changes in design temperature between said first and second values being linear with respect to linear movement of said slider.

15. A temperature control apparatus comprising in combination, a first electrical bridge having an outdoor weather sensing resistor having a temperature coefficient of resistance with heat applied thereto by an electrical current, said heated resistor being exposed to and its resistance varied by variations in outdoor temperature and wind velocity, said bridge having one grounded output terminal and another output terminal, a second electrical bridge having as one leg thereof a cycling resistor having an appreciable temperature coefficient of resistance, said second bridge having first and second output terminals, a slide-wire resistor connected between said other terminal of said first bridge and said first terminal of said second bridge, detecting means, means connecting said detecting means between said ground terminal of said first bridge and said second terminal of said second bridge to sense the balance of said bridges, means including said detecting means for cyclically energizing said cycling resistor, said energization being continuous when the temperature of said outdoor resistor drops below a predetermined value, a slider for said slide-wire resistor, a fixed resistor, and means connecting said resistor between said slider and said ground terminal of said first bridge so that when said slider is in one extreme position the temperature of said outdoor resistance which will result in continuous energization of said cycling resistor will be of a first value and when said slider is in the opposite extreme position the temperature resulting in continuous energization of said cycling resistor will be of a second value.

16. A temperature control apparatus comprising in combination, a first electrical bridge having an outdoor weather sensing resistor having a temperature coefficient of resistance with heat applied thereto by an electrical current, said heated resistor being exposed to outdoor temperature and wind velocity so that the resistance thereof will be varied with variations of said temperature and wind velocity, said bridge having one grounded output terminal and another output terminal, a second electrical bridge having as one leg thereof a cycling resistor having an appreciable temperature coefficient of resistance, said second bridge having first and second output terminals, a slide-wire resistor connected between said other terminal of said first bridge and said first terminal of said second bridge, detecting means, means connecting said detecting means between said ground terminal of said first bridge and said second terminal of said second bridge to sense the balance of said bridges, means including said detecting means for cyclically energizing said cycling resistor, said energization being continuous when the temperature of said outdoor resistor drops below a predetermined value, a slider for said slide-wire resistor, a fixed resistor, and means connecting said resistor between said slider and said ground terminal of said first bridge so that when said slider is in one extreme position the design temperature of said apparatus will be of a first value and when said slider is in the opposite extreme position the design temperature will be of a second value, said changes in design temperature between said first and second values being linear with respect to linear movement of said slider.

17. In a temperature control apparatus, a first electrical bridge having first and second output terminals, said bridge having a first temperature sensitive resistor sensitive to outdoor weather conditions and a second temperature sensitive resistor with means connecting said resistors in counterbalancing relation to each other in the legs of said bridge, a separate heater associated with each of said resistors, means continuously energizing said heaters so that in the absence of an external controlling factor said bridge will not be unbalanced by the heat applied to said resistors by said heaters, a second electrical bridge having first and second output terminals, said bridge including in an arm thereof a cycling resistor having an appreciable temperature coefficient of resistance whose changes in resistance are effective to vary the voltage on said output terminals, detecting means, means connecting the output terminals of said bridges in series to said detecting means so that said detecting means is sensitive to the output voltages of said bridges and operative in accordance with the voltage on said output terminals, and means including said detecting means for varying the resistance of said cycling resistor so that said cycling resistor effects operation of said detecting means in periods whose time length and frequency is determined by the unbalance of said first bridge resulting from the outdoor temperature and wind affecting the heat supplied by one of said heaters to said first resistor.

18. In a temperature control apparatus, a first electrical bridge having first and second output terminals, said bridge having a first temperature sensitive resistor sensitive to outdoor weather conditions and a second temperature sensing resistor with means connecting said resistors in counterbalancing relation to each other in the legs of said bridge, a separate heater associated with each of said resistors, means continuously energizing said heaters so that in the absence of an external controlling factor said bridge will not be unbalanced by the heat applied to said resistors by said heaters, a second electrical bridge having first and second output terminals, said bridge including in an arm thereof a cycling resistor having an appreciable temperature coefficient of resistance whose changes in resistance are effective to vary the voltage on said output terminals, detecting means, means connecting the output terminals of said bridges in series to said detecting means so that said detecting means is sensitive to the output voltages of said bridges and operative in accordance with the voltage on said output terminals, and means including said detecting means for varying the resistance of said cycling resistor so that said cycling resistor effects operation of said detecting means.

19. A temperature control apparatus comprising in combination, a balanceable electrical network having as one leg thereof an impedance whose impedance is varied in accordance with load demand and in another leg thereof a cycling impedance having an appreciable temperature coefficient of impedance, said network having a pair of output terminals, detecting means operable when energized for initiating operation of a space temperature changing means, means connecting said detecting means to said output terminals so that said detecting means is operative when the voltage on said output terminals is of a first value and when of a second value said detecting means is inoperative, a heater for said cycling impedance, and means including said detecting means for energizing said heater when a voltage of said first value is on said output terminals so that said cycling impedance is heated and the voltage on said terminals is changed to said second value whereupon said heater becomes deenergized, said heater remaining deenergized until said cycling impedance cools and a voltage of said first value appears on said output terminals whereupon said heater will be again energized and will thereafter cause said output voltage to continuously cycle between said first and second voltages at a rate determined by the load demand.

20. In combination, a thermostatic device exposed to a controlling temperature condition, a temperature sensitive device, temperature changing means, means connecting said devices to co-operate in controlling the operation of said temperature changing means, a compensating heater positioned in heat exchange relation to said temperature sensitive device, switch means for completing an energizing circuit to said heater whenever the temperature changing means is operative, a timer for connecting said heater in a continuously energized circuit, and variable impedance means connected in said last named circuit and varied by said timer for decreasing the energization of said heater according to a predetermined schedule while said timing means is continuously energizing said heater.

21. In combination, a thermostatic device exposed to a controlling temperature condition, a temperature sensitive device, temperature changing means, means connecting said devices to co-operate in controlling the operation of said temperature changing means, a cycling heater located in heat exchange relationship with said temperature sensitive device, switch means completing an energizing circuit to said heater when said temperature changing means is operative, timing means operating independently of said device for continuously energizing said heater for a predetermined period, and means including a variable impedance adjusted by said timer for decreasing the energization of said heater according to a predetermined schedule while said timing means is continuously energizing said heater.

22. In combination, in a temperature control apparatus, a source of power, an electrical device, temperature changing means, cyclically operating switch means for energizing said temperature changing means, means including said cyclically operating means for connecting said device in an energizing circuit to said source of power, a timer, temperature condition responsive means connected to said switch means to variably control cyclic operation of said switch means, a variable impedance adjusted by said timer, and further electrical means including a timer in said last named connection for rendering said cyclically operating switch means ineffective to energize said changing means and connecting said device to said source through said impedance to variably energize said device in accordance with time.

23. In an apparatus for maintaining a condition at a plurality of levels, a source of power, an electrical resistance heater, first switch means operating cyclically, means connecting said source of power to said resistance heater through said switch so that said heater is cyclically energized by the operation of said first switch means, second switch means, timing means for operatively actuating only said second switch means and rendering said first switch means ineffective to energize said heater, means connecting said source of power to said resistance heater through said second switch means when actuated, variable impedance means whose impedance varies with time, and means connecting said variable impedance means in circuit with said second switch means to variably energize said resistance heater when said second switch means is actuated.

24. In an apparatus for maintaining a condition at a plurality of levels, a source of power, an electrical resistance heater, first switch means operating cyclically, means connecting said source of power to said resistance heater through said switch means so that said heater is cyclically energized by the operation of said first switch means, second switch means, timing means, means including said timing means for operatively actuating only said second switch means and rendering said first switch means ineffective to energize said heater, means connecting said source of power to said resistance heater through said second switch means when actuated, variable impedance means, means including said timing means for varying the impedance of said variable impedance means, and means connecting said variable impedance means in circuit with said second switch means to variably energize said resistance heater when said second switch means is actuated.

25. In an apparatus for maintaining a condition at a plurality of levels, a source of power, an electrical resistance heater, first switch means operating cyclically, means connecting said source of power to said resistance heater through said switch means so that said heater is cyclically energized by the operation of said first switch means, second switch means, timing means, means including said timing means for operatively actuating only said second switch means and rendering said first switch means ineffective to energize said heater, means connecting said source of power to said resistance heater independently of said first switch means through said second switch means when actuated, variable impedance means, means including said timing means for varying the impedance of said variable impedance means, and means connecting said variable impedance means in circuit with said second switch means to variably energize said resistance heater when said second switch means is actuated.

MYRON R. SMITH.

REFERENCES CITED

The following references are of record in the file of this patent:

UNITED STATES PATENTS

| Number | Name | Date |
| --- | --- | --- |
| 1,736,474 | Williamson | Nov. 19, 1929 |
| 1,876,636 | Dicke | Sept. 13, 1932 |
| 1,981,282 | Smith | Nov. 20, 1934 |
| 2,136,753 | Penn | Nov. 15, 1938 |
| 2,148,491 | Moore | Feb. 28, 1939 |
| 2,205,164 | Chappell et al. | June 18, 1940 |
| 2,300,537 | Davis | Nov. 3, 1942 |
| 2,325,308 | Davis | July 27, 1943 |
| 2,359,160 | Sauter | Sept. 26, 1944 |
| 2,414,314 | Machlet | Jan. 14, 1947 |
| 2,451,778 | Sambur | Oct. 19, 1948 |